Patented Jan. 6, 1953

2,624,678

UNITED STATES PATENT OFFICE 2,624,678

HONEY PROCESS

Frank E. Hageman, Chico, Calif.

No Drawing. Application May 12, 1950,
Serial No. 161,737

6 Claims. (Cl. 99—146)

This invention relates to a process for treating honey and to a food product that includes the honey so treated.

One of the main objects of the invention is the provision of a process for treating honey for crisping the same and another object of the invention is the provision of a process for purifying honey that heretofore has been objectionable if not unusable.

The word "crisping" means the making of the honey crisp, as for a crisp coating for food products such as dry flaked or puffed grain, popcorn, etc.

The present process makes possible the coating of food products with a crisp layer of honey, and when such coating or layer is on the discrete particles of food, such as the dry flaked or puffed grain or popcorn, and packed, the crisped particles may readily be broken up and eaten in the usual manner in which such grains or popcorn is eaten, instead of being in a virtually inseparable sticky mass.

As to the purifying of honey, it is well known that some honey, such as buckeye honey, is so impure in its natural state that it is not usable by the bees themselves, while cedar, pine and oak honey are quite impure in their natural state.

With the present process the most impure honey may be purified without injury to the same.

Referring to the crisping of honey, where attempts have been made to merely cook the honey to a crispness and to apply it to food, the honey will burn and be ruined.

All honey contains an excess of moisture derived from the body of the bee, and this moisture will not evaporate with time or with ordinary cooking. The moisture is sealed within globular particles of syrup and until this is broken down, the honey cannot be crisped without burning it.

Also, many types of honey ferment, or crystallize before being extracted from the comb, according to the source. Cotton, alfalfa, fruit-tree, fireweed, and flower or blossom honey are some of the types of honey most likely to develop conditions of fermentation, or crystallization for the reason that these types of honey have less body, a lower keeping quality. Upon treatment by the present process, these types are purified, the objectionable portion is readily separated and removed, leaving a pure remainder, and the same holds true of buckeye honey which, in its natural state is more or less poisonous to human beings, as it is to the bees themselves.

Cedar, pine, and oak honey is unsuitable, in its natural state, for table use, and for coating foods. These types of honey are derived from a sap which appears on the leaf or trunk of these trees and is, in reality, an extraction or expelled fluid from the body of a worm, maggot or aphis, with which the tree is infested. Such honey is rendered pure by the present process, the objectionable portion being discarded.

In the examples hereinafter set out, each includes a final cooking step, and it is during this cooking step that the final purification of the honey is effected. In at least one of the examples given (heavy honey) a dark foam may appear on the top of the solution that is being cooked, and this is skimmed off until the foam is no longer dark, and at that point the honey has reached the proper state of purity for application of the honey to foods.

It is possible that certain of the finer types of honey may be reasonably pure when separated from the comb, and the foam may be practically white or colorless, but this honey still would require the present treatment for crisping it satisfactorily.

In the present process a solution of water, vinegar, salt and natural honey (less comb) is made and may be stored in any desired amount in a tank at room temperature of say about 60° F. to about 80° F. to ripen. One thousand gallon tanks are suitable, but size and volume are not particularly important. The solution is automatically stirred, preferably for 60 minutes, once every twelve hours during the ripening period, which is preferably 30 days at room temperature, although if left standing for a longer period of time, the quality of the solution is not impaired. The honey is preferably taken from the fermenting tank in about 10 gallon batches for cooking, due to the sensitivity of the solution to scorching when cooked in a much larger quantity.

Examples of the preferred treatment, prior to application of the honey to food products, for four different types of honey are as follows, it being understood in each instance that the solution is first allowed to ripen as above explained.

*Type A.*—Light weight or thin honey, regardless of color or source.

7½% hot water (150° F.)
¾ of 1% vinegar (#40)
¾ of 1% salt
Remainder, honey.
(The above percentages are by volume.)

Cooking may be started at about 70° F. and for a ten gallon batch, for example, the cooking is rapid, requiring about 10 minutes to raise the temperature to 250° F. As soon as 250° F. is reached, the cooking heat is gradually reduced. The temperature of the batch gradually rises to 280° F. (or 300° F. according to the type of food on which the solution is to be used) and when this temperature is reached the honey is immediately applied to the food. The over-all cooking time for a ten gallon batch is about 15 minutes.

*Type B.*—Medium weight honey, regardless of color or source.

12% hot water (150° F.)
1% vinegar (#40)
1% salt
Remainder, honey.
(The above percentages are by volume.)

Highspeed cooking is again performed, as in the case of type A honey. Starting at say 70° F. or room temperature, with a ten gallon batch, sufficient heat is applied to raise the temperature of the batch to 250° F. within 10 minutes, and then the applied heat is lowered while the temperature of the batch gradually rises to 260° F. (or 300° F. according to type of food on which the honey is to be used). The hot honey at said elevated temperature is then immediately applied to the food. The over-all cooking time is about 15 minutes.

*Type C.*—Heavy-weight honey, regardless of color or source.

15% hot water (150° F.)
1½% vinegar or cider (#40)
1½% salt
Remainder, honey.
(The above percentages are by volume.)

The steps are the same for type A honey except that the honey may be immediately used in some instances when the batch reaches 260° F. (or up to 300° F. depending on the type of food upon which it is used). With type C honey, a dark scum will be formed when it is cooked, and this must be skimmed off before the honey is used.

It is obvious from the foregoing that the water and vinegar are dispelled from the honey during the cooking step along with the undesirable moisture that the honey derived from the bee. The fermentation step enables the release, during cooking, of the moisture that was derived from the bee, without burning the honey.

Insofar as types A and B are concerned, during cooking, if a discolored foam appears, it is skimmed off until only a white foam appears. In type C, there is a foamy scum and this is skimmed off until the foam is white. This scum and discoloration are impurities. When they are skimmed off and only white foam is produced, the honey is pure.

The entire body of all types of the honey, when cooked to the proper stage for use on cereals, is foamy.

The fast cooking of the honey is desirable for the reason that it creates a large quantity of foam, aerating the solution, and the likelihood of scorching the honey is reduced.

During the cooking step the honey solution must not be stirred as stirring tends to close the pores opened by the fermentation and the honey would burn.

After the honey has reached the desired temperature, it is dumped over the previously heated food bodies in a large revolving or tumbling tank and the said bodies are tumbled until they are thoroughly coated with the honey.

The temperature of the food bodies when the honey is applied to them is preferably between about 120° F. and 150° F., and immediately after the honey is applied to the food warm air (about 90° F.) is blown over it until the honey is crisped, which usually takes about two minutes.

In coating the food, different amounts of treated honey may be required according to the character of the food. For example, where popcorn is treated, the honey may be about 70% of the entire mass, by weight, while it may be about 60% by weight when used on puffed rice or puffed wheat, and 50% by weight when used on cornflakes.

Insofar as the drying step is concerned, after the food has been coated, it is preferable that the air be reasonably dry for best results, and the average room temperature of from 60° F. to 80° F. is best for general processing.

The type of vinegar employed is not particularly important. It may be ordinary cider vinegar, and in some instances may be of higher proof than in others.

In the foregoing examples, the use of hot water enables fermentation to start, and also, hot water will not separate from the honey when in solution therewith, whereas cold water would separate. Without a proper fermentation step the honey could not be cooked without burning it.

By the employment of vinegar and honey, the necessary step of decomposition of the honey is set up and a sufficiently high alcohol content is maintained in the batch to preserve it during ripening.

Insofar as the salt is concerned, it aids as a purifier and is instrumental in congealing the body of the solution as well as enhancing the flavor.

It is to be understood that there may be some variations in the percentages specifically set out herein, although the precise percentages are preferable for accomplishing the desired results without unnecessary waste of materials and time. For example, the hot water used may run from about 5 to 15% by volume, and the vinegar from about ½ of 1% to about 2% by volume and give good results, according to the type of honey with which it is used, and while salt in the amount of from about ½ of 1% to 2% may be used, according to the type of honey, and is highly desirable, its use is not as essential as that of the vinegar and water. The honey itself, in the absence of water will not absorb the salt, but will go into solution with the water and is thus uniformly distributed in the batch.

I claim:

1. The process of crisping honey that comprises the steps of; adding vinegar to the honey fermenting the honey and then heating said fermented honey to about 250° F. to 300° F., and thereafter permitting the honey to cool.

2. The process of crisping honey that comprises the steps of; adding vinegar to the honey fermenting the honey, then heating said fermented honey free from agitation from an outside source to about 250° F. to 300° F., and thereafter permitting the honey to cool.

3. The process of crisping honey that comprises the steps of; adding vinegar to the honey fermenting the honey, then heating said fermented honey from substantially atmospheric temperature to about 250° F. to 300° F. within a period of from about 10 to 15 minutes and free from agitation from an outside source, and thereafter permitting the honey to cool.

4. The process of crisping honey that comprises the steps of; adding vinegar to the honey fermenting the honey for a period of about 30 days at about atmospheric temperature, stirring said honey during said period about once every twelve hours, then heating the honey so fermented free from agitation by an outside source to about 250° F. to 300° F. and thereafter permitting said honey to cool.

5. The process of crisping honey that comprises the steps of; adding from about 5% to 15% by volume of water at about 150° F. and from about ½ of 1% to about 2% #40 vinegar, by volume relative to the body of honey to said body to provide a fermentable honey solution, then permitting said solution to ferment for a period of substantially thirty days, then heating said fermented solution to from about 250° F. to about 300° F. and thereafter permitting said heated solution to cool.

6. The process of crisping honey that comprises the steps of; providing a fermentable honey solution by adding water, vinegar and salt to a body of honey in the proportion of about 5% to 15% water by volume, about ½ of 1% to 2% #40 vinegar by volume, and about ½ of 1% to 2% salt by volume relative to said body, then permitting said solution to ferment for a period of substantially 30 days and stirring said solution periodically during said period, thereafter heating the fermented solution from about atmospheric temperature to about 250° F. within a period of about ten minutes for each 10 gallons thereof, then increasing the temperature of said solution from about 250° F. to from about 280° F. to 300° F. within a period of about five minutes, and immediately thereafter permitting said heating solution to cool.

FRANK E. HAGEMAN.

REFERENCES CITED

The following references are of record in the file of this patent:

UNITED STATES PATENTS

| Number | Name | Date |
|---|---|---|
| 1,038,307 | Dayton | Sept. 10, 1912 |
| 2,414,290 | Erickson et al. | Jan. 14, 1947 |